United States Patent Office 3,495,998
Patented Feb. 17, 1970

3,495,998
RESINOUS COMPOSITIONS
Howard F. Reeves, Jr., John L. Rose, Jr., and Caldwell S. Quillen, Chattanooga, Tenn., assignors to Velsicol Chemical Corporation, Chattanooga, Tenn., a corporation of Tennessee
No Drawing. Continuation of application Ser. No. 557,642, June 15, 1966. This application Dec. 27, 1967, Ser. No. 694,018
Int. Cl. C08b *21/00;* C08f *29/40, 29/46*
U.S. Cl. 106—176     10 Claims

ABSTRACT OF THE DISCLOSURE

An homogeneous plastic composition comprising a resinous material selected from the group consisting of cellulose resins, vinyl resins and acrylic resins and a fortifying amount of sucrose benzoate.

---

This application is a continuation of application Ser. No. 557,642, filed June 15, 1966, now abandoned, which is a continuation-in-part of our copending application Ser. No. 332,306 filed Dec. 20, 1963, now abandoned, which in turn is a continuation-in-part of application Ser. No. 130,771, filed Aug. 11, 1961, now abandoned.

This invention relates to improved resinous and plastic compositions, and more particularly to sucrose benzoate plastic compositions.

We have found that by incorporating sucrose benzoate in synthetic resinous or plastic compositions, improved properties are imparted to such compositions. These improved properties include increased or modified hardness, gloss, surface appearance, resistance to certain extractive agents and ease of processing and forming of the plastic or resinous materials.

The range of resinous or plastic material with which sucrose benzoate is compatible is relatively large; however, the modifying effect of sucrose benzoate on certain materials is more pronounced than on other materials, as will be pointed out hereinafter. Of particular interest in the present invention are the vinyl, cellulose and acrylic, including methacrylic, resins. It has been found that these resins when fortified with the sucrose benzoate possess the valuable properties listed above. Exemplary of the resins of these classifications are: ethyl cellulose, nitrocellulose, cellulose acetate-butyrate, cellulose acetate, polyvinyl chloride, polyvinyl acetate, vinyl acetate-vinyl chloride copolymer, polyvinylidine chloride, polystyrene, poly (methyl acrylate), poly (methyl methacrylate), poly (butyl acrylate) and poly (2-ethyl hexyl acrylate). The sucrose benzoate can be incorporated into the materials by hot melt techniques, from a mutual solvent or by milling the components at elevated temperatures as will be understood by those skilled in the art.

A highly benzoylated sucrose benzoate can be made from sucrose and benzoyl chloride in the presence of sodium hydroxide and a mutual solvent for sucrose benzoate and benzoyl chloride, such as toluene. Material prepared and purified by the method of Ness, Journal of the American Chemical Society, 74, 5344-6, 1952, is workable. Material containing an average of 5 to 8 benzoate groups per molecule of sucrose is workable but material having 7 to 8 benzoate groups per molecule of sucrose is preferred. This sucrose benzoate is an amorphous, glass-like product at room temperature. It is insoluble in water and is a molten liquid at temperatures in excess of 100° C. It has a ball and ring softening point of 75 to 95° C., preferably 85 to 95° C., a specific gravity of approximately 1.25 at 25° C., a refractive index of 1.557 at 25° C., a viscosity of about 4,000 cps. at 100° C. and about 5900 cps. at 150° C. Sucrose benzoate is soluble in toluene, benzene, acetone, ethyl acetate, ethylene dichloride, and diethyl ether at room temperature. It is practically insoluble in water and heptane and is resistant to boiling water and dilute mineral acids.

Benzoylated sucrose containing less than about 5 benzoate radicals per molecule of sucrose is not suitable in the production of the homogeneous compositions of the present invention since such materials tend to be unworkable and have undesired physical characteristics, including relatively low softening points and relatively high viscosities. Also not useful in the present compositions are sucrose benzoate compositions that are water soluble. Thus it can be seen that the characteristics of the sucrose benzoate are of significance in the present invention.

With respect to polyvinyl chloride, the physical properties of plastic compositions were tested by making samples from sucrose benzoate and polyvinyl chloride. In more detail, samples were made by melting together sucrose benzoate, stearic acid, stabilizer and dipropylene glycol dibenzoate (plasticizer). Each mixture was then added to resin powder, the admixture thus produced being stirred in a blending mixer for fifteen minutes. Each admixture, when thoroughly blended, was placed on a 6" x 12" two-roll rubber mill with the rollers thereof heated by 60 p.s.i. steam. The admixture, when thoroughly milled, was sheeted off to a thickness of approximately 50 mils prior to conducting the tests indicated for the various samples in Table I.

In the extraction loss tests of Table I, sample specimens, 3" x 3" by 50 mils thick, were submerged in a large volume of extractants for 24 hours at room temperature (25° C.) and were then removed and dried to constant weight. A 1% Ivory soap solution was used as one extractant, a commercial gasoline was used as a second extractant.

TABLE I.—POLYVINYL CHLORIDE COMPOSITIONS

| Formulation | Test | | | |
|---|---|---|---|---|
| | A | B | C | D |
| Parts polyvinyl chloride resin [1] | 100 | 100 | 100 | 100 |
| Parts plasticizer (dipropylene glycol dibenzoate) | 40 | 40 | 40 | 40 |
| Parts barium-cadmium stabilizer [2] | 3 | 3 | 3 | 3 |
| Parts stearic acid | 1 | 1 | 1 | 1 |
| Parts sucrose benzoate | 0 | 10 | 20 | 30 |
| Physical Properties of Sheet: | | | | |
| Tensile, p.s.i. | 3,000 | 3,084 | 2,940 | 3,006 |
| Elongation, percent | 240 | 235 | 265 | 260 |
| Modulus, 100%, p.s.i. | 1,586 | 1,813 | 1,620 | 1,701 |
| Hardness, Shore A | 90 | 89 | 93 | 95 |
| Extraction Losses, Percent: | | | | |
| Gasoline | −2.69 | −2.03 | Nil | −0.56 |
| Soapy water | −0.14 | −0.13 | −0.09 | −0.07 |

[1] Resin used was medium molecular weight polyvinyl chloride resin. Formulations were all milled for 12 minutes on a two-roll mill, sheeted, and tested by standard methods.
[2] Stabilizer (a product of commerce produced by Argus Chemical Company) liquid barium-cadmium complex, a mixture of organic salts of barium and cadmium in liquid form.

The tests described for Table I were repeated on additional samples, these samples being made by a plastisol technique, i.e. by blending sucrose benzoate, and the barium-cadmium stabilizer into dioctyl phthalate to produce a solution. Thereafter, finely divided polyvinyl chloride ("Geon 121") was stirred into this solution. Each resulting mass was then deaerated using a vacuum to remove entrained air bubbles and thereafter cast into 3" x 3" by 50 mils thick specimen samples which were each oven cured for 15 minutes at 350° F.

The plastisol samples were then subjected to the same extraction loss tests as described for Table I. The ingredients of the plastisol samples and the results of the tests thereon are given in Table II.

TABLE II

| Formulation | Test A | Test B | Test C |
|---|---|---|---|
| Parts polyvinyl chloride | 100 | 100 | 100 |
| Parts dioctyl phthalate | 40 | 40 | 40 |
| Parts barium cadmium stabilizer | 3 | 3 | 3 |
| Parts sucrose benzoate | 0 | 20 | 40 |
| Physical properties of sheet: | | | |
| Tensile, p.s.i. | 2,788 | 2,770 | 2,394 |
| Elongation | 290 | 330 | 330 |
| Modulus, 100%, p.s.i. | 1,242 | 1,030 | 848 |
| Hardness, Shore A | 85 | 80 | 80 |
| Extraction losses, percent: | | | |
| Gasoline | −13.92 | −9.57 | −8.64 |
| Soapy water | −0.87 | −0.65 | −0.22 |

We have produced sheets of polyvinyl chloride by milling a medium molecular weight resin with 40 parts sucrose benzoate per 100 parts of resin in presence of three parts of barium cadmium stabilizer at temperatures of 160° C. for five to ten minutes without the addition of plasticizer. The cooled product is a homogeneous hard sheet that has a tensile strength of 6,000 p.s.i. with no detectable elongation and a Shore A hardness of 99. Lesser amounts of sucrose benzoate can be used to produce a more fluid hot resin mix at processing temperatures without imparting any appreciable degree of plasticity to the polyvinyl chloride sheet when it is brought back to room temperature.

Sucrose benzoate in combination with vinyl chloride-vinyl acetate copolymers containing some 15% vinyl acetate imparts properties similar to those illustrated for polyvinyl chloride homopolymer.

Polyvinyl chloride sheets containing a high filler content were prepared by milling the following mixes on a two-roll rubber mill at 150° C. for ten minutes followed by sheeting and pressing. These sheets were exposed to identical extraction conditions for a period of seven days at room temperature. The formation and results of the tests are found in Table III.

TABLE III

| Formulation | Parts | Parts |
|---|---|---|
| Polyvinyl chloride resin | 100 | 100 |
| Dipropylene glycol dibenzoate | 32 | 32 |
| Epoxy soyabean oil | 5 | 5 |
| Calcium carbonate | 180 | 180 |
| Stearic acid | 1 | 1 |
| Barium cadmium stabilizer | 2 | 2 |
| Sucrose benzoate | 37 | 0 |
| Extraction Losses: | | |
| Percent wt. loss gasoline extraction | −1.4 | −8.2 |
| Percent soapy water extraction | 0.00 | −0.25 |

It is therefore seen that sucrose benzoate has a high degree of compatibility with polyvinyl chloride, reduces extraction losses and imparts favorable processing characteristics while imparting no appreciable plasticizing properties at room temperature.

Sucrose benzoate is also compatible with polyvinyl acetate alone and in the presence of plasticizers for polyvinyl acetate. Films[1] have been prepared for solutions of sucrose benzoate and polyvinyl acetate wherein methyl ethyl ketone was used as solvent. On air drying thin layers of this solution, clear transparent films were obtained. Oven drying at 158° F. completely removes solvent. The results are found in Tables IV and V.

TABLE IV

| Film composition | | | | | |
|---|---|---|---|---|---|
| Parts polyvinyl acetate | 100 | 100 | 100 | 100 | 100 |
| Parts sucrose benzoate | 25 | 66.6 | 100 | 200 | 400 |
| Compatibility | (1) | (1) | (1) | (1) | (1) |

[1] Clear and compatible.

TABLE V

| Film composition | | | | |
|---|---|---|---|---|
| Parts polyvinyl acetate | 100 | 100 | 100 | 100 |
| Parts sucrose benzoate | 0 | 25 | 66.6 | 400 |
| Sward hardness | 40 | 50 | 61 | 64 |

These harder compositions produced by the combination of polyvinyl acetate and sucrose benzoate are useful in surface coating, and in heat sensitive adhesives. In addition, the sucrose benzoate imparts to the polyvinyl acetate a slick texture which facilitates the stacking and unstacking of fibrous materials impregnated or coated therewith. Therefore, heat sealable films produced from materials such as paper coated with polyvinyl acetate containing sucrose benzoate may be more easily handled without danger of adhesion prior to heat sealing.

Additional tests were performed to show the effect of the percentage of sucrose benzoate on the hardness of resin systems. The following table shows the hardness as measured by the Sward method.

| | Percent sucrose benzoate | | |
|---|---|---|---|
| | 20 | 40 | 80 |
| Polyvinylchloride acetate copolymer | 36 | 41 | 54 |
| Polyvinyl acetate | 50 | 61 | 64 |
| Polyvinylidene chloride | 28 | 32 | 54 |
| Polymethyl methacrylate | 23 | 30 | 50 |
| Cellulose acetate butyrate | 40 | 42 | 62 |
| Ethyl cellulose | 43 | 50 | 53 |
| Nitrocellulose | 49 | 59 | 58 |
| Polystyrene | 30 | 33 | 39 |

We have also observed that sucrose benzoate is compatible with plasticizer for vinyl acetate, such as dibutyl phthalate, benzyl butyl phthalate and glycol dibenzoates. Hence, admixtures of polyvinyl acetate, plasticizer and sucrose benzoate may be formulated if desired.

With respect to still other resins or plastics, films of sucrose benzoate and various resinous and plastic materials have been made by depositing a thin layer of a solution of the two materials on glass, allowing the solvent to evaporate at room temperature, followed by force drying in an oven at 158° F. to remove residual solvent. The results of these tests are shown in the following Table VI. The letter C indicates that a compatible clear transparent film was obtained, while H indicates a slight haze in a transparent to a translucent film but considered compatible and I indicates an incompatible film as judged by opaqueness.

The percentage of the film that is sucrose benzoate is shown at the top of the column and the compatibility is listed under the appropriate percentages.

TABLE VI

| Percentage Sucrose Benzoate | 20 | 40 | 50 | 60 | 80 |
|---|---|---|---|---|---|
| Cellulosics: | | | | | |
| Ethyl cellulose | C | C | H | I | I |
| Nitrocellulose (½ sec. visc.) | C | C | C | C | C |
| Cellulose acetate-butyrate (½ sec. visc.) | C | C | C | C | C |
| Cellulose acetate | C | C | I | I | I |
| Vinyls: | | | | | |
| Polyvinyl chloride (acetate 13%) | C | C | C | H | I |
| Polyvinyl acetate [1] | C | C | C | C | C |
| Polyvinyl chloride | C | C | C | C | H |
| Polyvinylidene chloride | H | H | H | H | H |
| Polystyrene | C | C | C | H | H |
| Poly (methyl acrylate) | C | C | C | C | C |
| Poly (methyl methacrylate) | C | C | C | C | C |
| Poly (butyl acrylate) | C | C | C | C | C |
| Poly (2-ethyl hexyl acrylate) | C | C | C | C | C |

[1] Three different commercial types.

---

[1] Hardness of polyvinyl acetate film is increased as measured by the Sward method using glass as 100.

It is therefore seen that a substantially homogenous combination may be made by the admixture of sucrose benzoate and water insoluble vinyl resins, water insoluble cellulosic resins or water insoluble acrylic resins. Sucrose benzoate in the above listed synthetic resin compositions imparts increased hardness to the composition. It is compatible with a large number of plasticizers and modifiers that are used with the above listed polymers and resins, such as alkyl phthalates, aromatic hydrocarbon resins, rosin, ester gum, alkyd resins, chlorinated rubber and acrylonitrile butadiene rubbers.

Due to the variance in the characteristics of the resinous material of the present invention, the precise amount of sucrose benzoate to be used will vary from resin to resin. The present invention contemplates the use of a fortifying quantity of sucrose benzoate, i.e., an amount necessary to impart the desired properties of hardness, gloss, surface appearance, resistance to extraction and ease of processing and yet still form an homogenous plastic composition. As can be seen from the foregoing tables of data, this fortifying amount of sucrose benzoate can vary between about 10 to about 90 percent by weight of the resinous material component of the present composition. Other ratios of components can be useful in specific instances.

Sucrose benzoate alone has been deposited from solvents, such as toluene or acetone, as a clear, bright, transparent film. These films can be dyed or pigmented by incorporation of suitable colorant in the sucrose benzoate solution prior to deposition of film. These brittle films can be modified by incorporation of relatively small amounts of resin as toughener and/or plasticizer as softener along with other additives to produce colored printing inks and adhesive compounds.

A variety of additives are commonly employed in resinous systems such as those contemplated by the present invention. The purpose of these materials is to provide specialized properties to the resinous compositions an varying with the ultimate application of the composition. Thus there can be included in the present systems varying amounts of plasticizers, stabilizers, lubricants, pigments, fillers, etc. The amount of each of the additives necessary to be effective in most instances is relatively small.

Included in the fillers useful for this purpose are asbestos, carbon black, clays, magnesium and calcium carbonates, sulfates and silicates. Normally the particle size of these fillers will be from 0.1 to 50 microns.

Among the stabilizers that can be present are dilauryl-beta-thiodipropionate, phthalic anhydride, trimellitic anhydride, substituted phenols, cresols and xylenols. A variety of other additives useful to perform as stabilizers for thermal and light stability can be present in the resinous compositions. For most purposes the use of stabilizers in an amount higher than 10 weight percent of the resinous composition will not impart additional benefit into the system. In certain instances as little as 0.5 weight percent of the resinous composition will impart the desired effect from this additive.

When desired lubricants can also be incorparted into the resinous composition. Exemplary of these additives are the metal soaps, calcium and barium stearate, waxes, and stearic and lauric acid. As in the case of the use of the other ancillary additives, the use of the lubricants is well known to those skilled in this art. This is also the case of the incorporation of plasticizers such as tricresyl phosphate, dibutyl phthalate, dioctyl phthalate, etc.

Often it is preferred to have a pigmented system. This can be accomplished by incorporating pigments into the system. Included in the useful pigments are carbon black, titanium dioxide, chrome oxide and phthalocyanine blue.

In addition to the aforedescribed advantages of the use of sucrose benzoate in the present compositions, an additional advantage is obtained in having a substantial improvement in the wetting and dispersion of the pigment.

In order to substantiate this advantage 12 systems were prepared six using a sucrose benzoate fortified system and six control systems without sucrose benzoate. The pigments used were carbon black and titanium dioxide, while the resins used were nitrocellulose, a polyvinyl chloride-acetate copolymer and an acrylic ester polymer.

The systems were prepared by preparing a solution of the particular resin in the designated solvent.

For the nitrocellulose system the solvent consisted of ethyl alcohol (10 parts), n-butyl acetate (40 parts), toluene (25 parts) and xylene (25 parts); for the polyvinyl chloride-acetate copolymer the solvent consisted of methyl isobutyl ketone (50 parts), and toluene (50 parts) and toluene was used as the solvent for the acrylic ester polymer. Then a specified amount of pigment was added to the resin solution. Titanium dioxide was added at a ratio of 25 parts per 100 parts of the resin solution. Carbon black was added at a ratio of 7 parts per 100 parts of the resin solution.

In the systems fortified with sucrose benzoate (S.B.) the sucrose benzoate was added to the resin system as a replacement of 20% of the resin contained in the solution, i.e. the solution contained 80 parts of the resin and 20 parts of sucrose benzoate.

Then the pigmented resin solution (100 grams) was combined with an equal weight of sand (12–16 mesh) and the combination was agitated by means of a paint shaker. During the course of sand grinding the degree of dispersion of the pigment was determined by measuring the fineness of the grind. The fineness of the grind was determined by means of a Hegman gauge and recorded in Hegman National Standard Units as follows:

TABLE I.—DISPERSION OF TITANIUM DIOXIDE

| Time, minutes: | Nitrocellulose | | Polyvinyl chloride Acetate Copolymer | | Acrylic ester polymer | |
|---|---|---|---|---|---|---|
| | S.B. | No S.B. | S.B. | No S.B. | S.B. | No S.B. |
| 5 | 6 | 4 | 6 | 5 | 6½ | 6 |
| 10 | 6½ | 5½ | 7¼ | 6½ | 7½ | 7 |
| 15 | 7 | 6¼ | | 7 | | |
| 20 | | 6½ | | | | |
| 25 | | 6¾ | | | | |
| 30 | | 7 | | | | |

TABLE II.—DISPERSION OF CARBON BLACK

| Time, minutes: | Nitrocellulose | | Polyvinyl chloride Acetate Copolymer | | Acrylic ester polymer | |
|---|---|---|---|---|---|---|
| | S.B. | No S.B. | S.B. | No S.B. | S.B. | No S.B. |
| 15 | 1½ | | 4 | 2 | 3½ | 2½ |
| 30 | 2½ | 1½ | 4½ | 3 | 5 | 4¼ |
| 40 | | | | | 5½ | 5 |
| 45 | 4 | 3 | 5¼ | 4 | | |
| 50 | | | | | 6 | 5½ |
| 60 | 5 | 3¾ | 6 | 5 | 6½ | 5¾ |

We claim:
1. An homogeneous plastic composition comprising a resinous material selected from the group consisting of ethyl cellulose, nitrocellulose, cellulose acetate butyrate, cellulose acetate, polyvinyl chloride, vinyl acetate-vinyl chloride copolymer, polyvinylidene chloride, polystyrene, polymethyl acrylate, polymethyl methacrylate, polybutyl acrylate, and poly 2-ethyl hexyl acrylate and sucrose benzoate having from about 5 to about 8 benzoate groups per sucrose molecule in an amount of from about 10 to about 90 percent by weight of the resinous material.

2. The composition of claim 1 wherein the sucrose benzoate has from about 7 to about 8 benzoate groups per sucrose molecule.

3. The composition of claim 1 wherein the resinous material is cellulose acetate butyrate.

4. The composition of claim 1 wherein the resinous material is nitrocellulose.

5. The composition of claim 1 wherein the resinous material is polyvinyl chloride.

6. The composition of claim 1 wherein the resinous material is polymethyl acrylate.

7. The composition of claim 1 wherein the resinous material is polymethyl methacrylate.

8. The composition of claim 1 wherein the resinous material is vinyl chloride-vinyl acetate copolymer.

9. The composition of claim 1 containing titanium dioxide pigment.

10. The composition of claim 1 containing carbon black pigment.

References Cited

UNITED STATES PATENTS

| 3,057,743 | 10/1962 | Tovey | 106—162 |
|---|---|---|---|
| 2,931,802 | 3/1960 | Tovey | 106—162 |
| 2,975,152 | 3/1961 | Hurwitz | 260—316 |
| 2,381,247 | 8/1945 | Barth | 260—316 |

FOREIGN PATENTS

| 619,500 | 3/1949 | Great Britain. |
|---|---|---|
| 806,935 | 1/1959 | Great Britain. |
| 140,263 | 1/1962 | Germany. |

MORRIS LIEBMAN, Primary Examiner

H. H. FLETCHER, Assistant Examiner

U.S. Cl. X.R.

106—178, 179; 260—17.4, 31.4, 31.6, 30.4, 234

PO-1050
(5/69)

UNITED STATES PATENT OFFICE
CERTIFICATE OF CORRECTION

Patent No. 3,495,998      Dated February 17, 1970

Inventor(s) Howard F. Reeves, Jr., John L. Rose, Jr. and
Caldwell S. Quillen

It is certified that error appears in the above-identified patent and that said Letters Patent are hereby corrected as shown below:

Col. 2, line 8, "5900" should read --590--.

Col. 3, line 51 "formation" should read --formulation--.

Col. 5, line 37, "an" should read --and--.

SIGNED AND
SEALED
JUL 14 1970

(SEAL)
Attest:

Edward M. Fletcher, Jr.
Attesting Officer

WILLIAM E. SCHUYLER, JR.
Commissioner of Patents